United States Patent [19]
Meredith

[11] Patent Number: 6,106,392
[45] Date of Patent: Aug. 22, 2000

[54] COMPUTERIZED POOL CUE AND CONTROLLER

[76] Inventor: Christopher Meredith, 3 Whero La., Nantucket, Mass. 02554

[21] Appl. No.: 08/903,100

[22] Filed: Jul. 30, 1997

[51] Int. Cl.[7] .............................. A63B 71/00; A63F 13/00
[52] U.S. Cl. .............................. 463/2; 463/36; 273/148 B
[58] Field of Search ................................ 463/36, 37, 38, 463/39, 2; 473/1, 2; 345/145, 156, 160; 273/148 B, 459–461

[56] References Cited

U.S. PATENT DOCUMENTS

| | | |
|---|---|---|
| D. 300,235 | 3/1989 | Nicotra . |
| D. 312,290 | 11/1990 | Rodriquez . |
| D. 354,106 | 1/1995 | Thompson . |
| 2,931,649 | 4/1960 | Furda . |
| 3,091,466 | 5/1963 | Speiser . |
| 3,508,440 | 4/1970 | Murphy . |
| 3,633,007 | 1/1972 | Sanders . |
| 3,633,008 | 1/1972 | Sanders . |
| 4,053,153 | 10/1977 | Josenhans . |
| 4,086,630 | 4/1978 | Speiser et al. . |
| 5,066,008 | 11/1991 | Rivera . |
| 5,238,457 | 8/1993 | Triplett . |
| 5,474,502 | 12/1995 | Brown . |
| 5,734,370 | 3/1998 | Skodlar ................................ 345/156 |

*Primary Examiner*—Mark A. Sager
*Attorney, Agent, or Firm*—Weingram & Associates, P.C.

[57] ABSTRACT

A combination pool cue stick and controller is provided which includes a housing.

A preferred embodiment of the invention includes a housing adapted to move over a flat surface, the housing including a stalk extending upwardly from the housing supporting a tapered tubular or ring-like member adapted to receive a pool cue, sensing means in the housing, the stalk and the tubular member to sense the position and movement of the pool cue and send this information to circuitry which processes the information for input into a computer which in turn uses appropriate compatible software to display the effects of the pool cue activity.

13 Claims, 3 Drawing Sheets

COMPUTERIZED POOL CUE AND CONTROLLER

BACKGROUND OF THE INVENTION

1. Field of the Invention

The present invention relates to computer pool games and in particular, to a computerized pool cue and controller to simulate the action and feel of using a pool cue.

2. Description of the Related Art

Devices and systems are known to simulate leisure activities such as golf, pool or billiards and fishing. For example,

| U.S. Pat. No. | Inventor(s) |
|---|---|
| 3,091,466 | Speiser |
| 3,508,440 | Murphy |
| 3,633,007 | Sanders |
| 3,633,008 | Sanders |
| 4,086,630 | Speiser, et al. |
| 5,066,008 | Rivera |

U.S. Pat. No. 3,091,466 to Speiser discloses a computer-type golf game which consists of an impact screen element and photocell units. Upon impact of a golf ball upon the screen, the screen is distorted from its normally planar condition to permit at least one of the photocell units to generate a signal which will indicate the completion of flight of the golf ball.

U.S. Pat. No. 3,508,440 to Murphy discloses a golf game consisting of a detecting means for when the ball has been hit from a tee and a location means for determining when the ball has reached a predetermined locale, and a computing means for providing information relative to the trajectory of the flight of the ball hit from the tee.

U.S. Pat. No. 3,633,007 to Sanders discloses a golf game computer having an improved drag circuit to provide a representation of the instantaneous velocity of the golf ball.

U.S. Pat. No. 3,633,008 to Sanders discloses a golf game computer having a bounce and roll generator.

U.S. Pat. No. 4,086,630 to Speiser et al. discloses a computer type golf game having a visible fairway display, whereby attained yardage as indicated by the computer activates the progression of slides to a projection position to simulate a different area on the fairway.

U.S. Pat. No. 5,066,008 to Rivera discloses an electronic voice and control system for billiards which keeps score and is connected to audio and visual input/output elements. The system includes sensors at each of the pockets of the billiard table and open switches designed to close when a ball enters a particular pocket so that various aspects, players scores, "scratch", etc., can be indicated. In a preferred embodiment, each one of the object balls is coated with a magnetic material so that a magnetic sensing means can sense when the particular ball has entered a pocket.

In addition, a fishing rod and reel electronic game controller is disclosed in my U.S. Pat. No. 5,542,672 which issued Aug. 6, 1996.

Among the known devices and systems, there is no disclosure of a pool cue in combination with a joy stick and mouse to provide a user with the "feel" of the resistance encountered when using a pool cue.

OBJECTS AND SUMMARY OF THE INVENTION

It is an object of the present invention to provide a computerized pool cue and controller for a user to play a game of pool or billiards (hereinafter referred to as "pool") and experience the feel of actually using the pool stick through software simulation. The actual motion of the pool stick provides the simulation of playing a game of pool and signals the results of a cue stroke by software simulation.

It is another object of the present invention to provide a device which permits the user to move the pool cue and select different forms of "English" to be applied to a pool ball.

It is another object of the present invention to provide the controller as a modification of a computer mouse.

It is another object of the present invention to provide a computerized pool cue and controller which uses standard mouse and keyboard commands to control the software for the system.

A preferred embodiment of the invention includes a housing adapted to move over a flat surface, the housing including a stalk extending upwardly from the housing and supporting a tapered tubular or ring-like member adapted to receive a pool cue, sensing means in the housing, the stalk and the tubular member to sense the position and movement of the pool cue and send this information to circuitry which processes the information for input into a computer, which in turn uses appropriate compatible software to display the effects of the pool cue activity.

BRIEF DESCRIPTION OF THE DRAWINGS

For a more complete understanding of the present invention, reference may be had to the following detailed description of the preferred embodiments taken in connection with the drawings, of which.

DETAILED DESCRIPTION OF THE PREFERRED EMBODIMENTS

Figure 1:
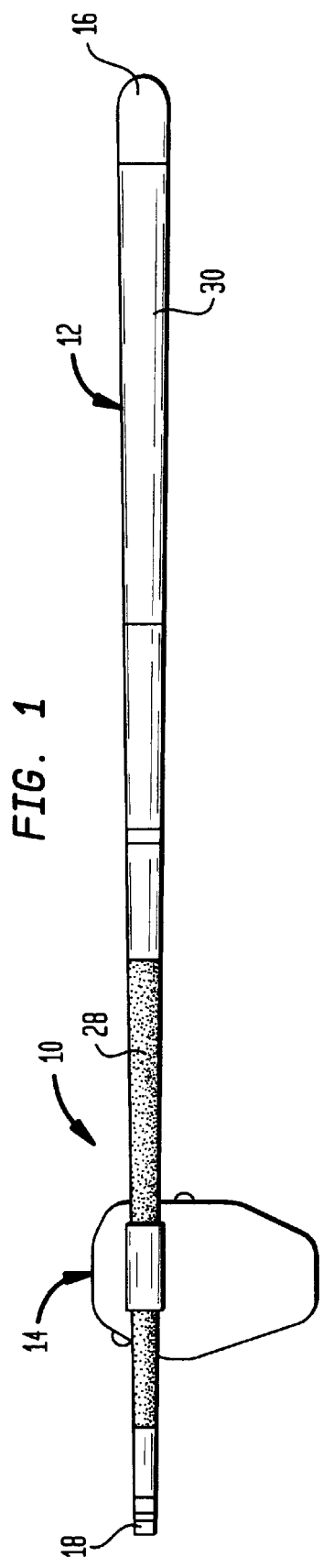
FIG. 1 is a top plan view of a computerized pool cue mounted for use with a controller according to the present invention.
Figure 2:
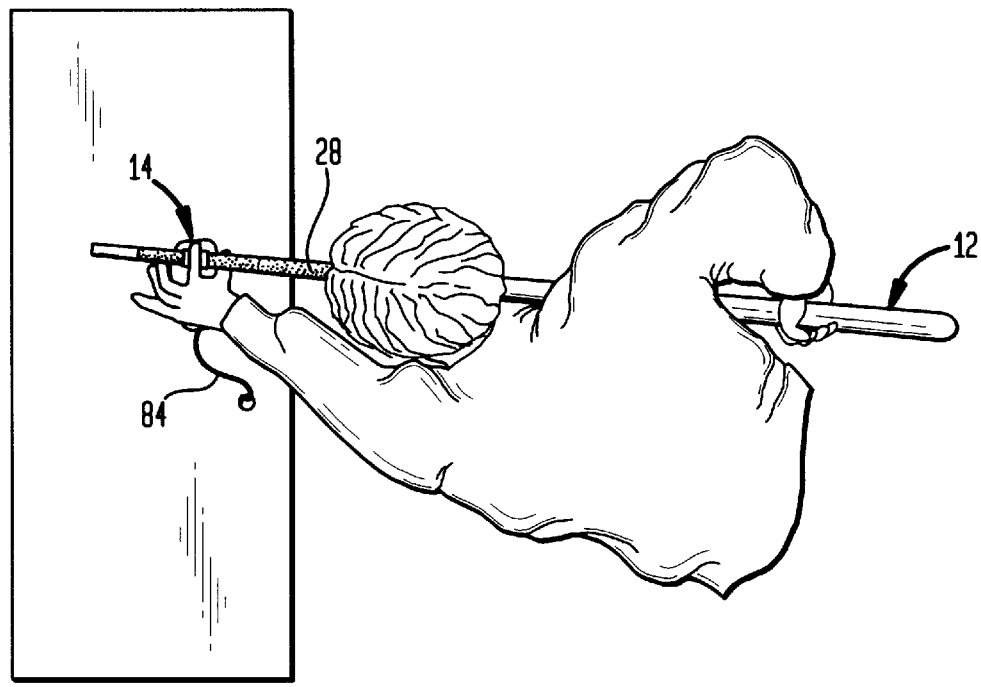
FIG. 2 is a top plan view of the computerized pool cue and controller of the present invention being used for a game of pool.

The present invention indicated generally at 10 includes a computerized cue stick 12 (hereinafter "cue") and a controller 14 as shown in FIGS. 1 and 2. The mounting of the cue 12 with the controller 14 and the coaction therewith is shown in FIG. 1. FIG. 2 shows the hand and finger placement employed to use the present invention. As shown in FIG. 2, it is apparent how similar the grasping and manipulation of the cue 12 and controller 14 resembles actually holding a cue stick and supporting it with the opposite hand to effect a pool "shot". FIGS. 3–5C show with more particularity the elements of the computerized cue 12 and controller 14 according to the present invention.

Figure 3:
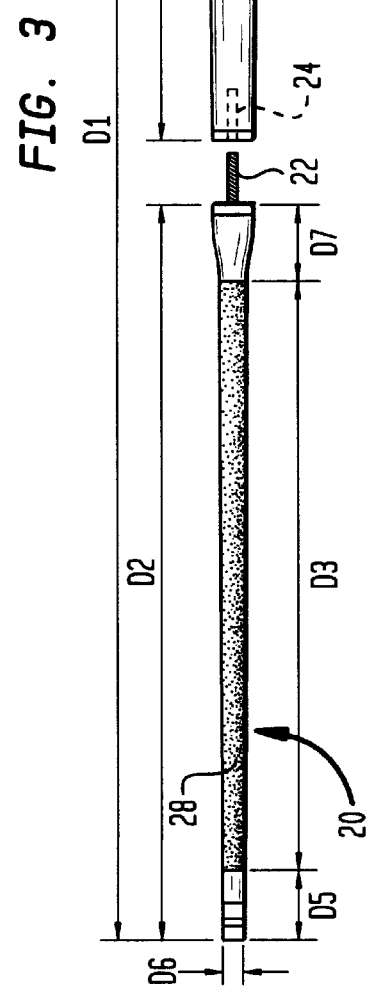
FIG. 3 is a partial cross sectional view of the pool cue according to the present invention.

FIG. 3 shows the cue 12 of the present invention. The cue 12 is constructed to be of regulation length, although the cue can be constructed to other lengths depending upon the arm length and "reach" of the user. The cue 12 is manufactured from known materials, such as wood, plastic or graphite components. The cue tapers from an end 16 or butt portion toward a tip 18 to contact a pool ball (not shown).

The cue 12 can be constructed as two separate portions with a forward portion 20 having a threaded bolt 22 to releasably engage a threaded insert 24 of a rear portion 26. The bolt 22 is preferably at least 1½ inches long and ⅜"°wide.

A coating 28 is applied to a select area of the forward portion 20. The coating 28 is similar to the rubber compound used to manufacture a ball of a computer mouse. The coating 28 extends continuously along the forward portion 20 of the cue 12 for a predetermined length. The rear 26 or gripping portion of the cue 12 is provided with the conventional rubber grip 30 to facilitate control of the cue stick 12 during game play.

The dimensions of the cue 12 in FIG. 3 are designed to accommodate the arm length of the user, with preferred dimensions as follows:

D1=38 inches
D2=19 inches
D3=17 inches
D4=1 inch
D5=1 inch
D6—½ inch
D7=1 inch

Other dimensions for the elements D1–D7 discussed above are also suitable for the invention.

Figure 4:
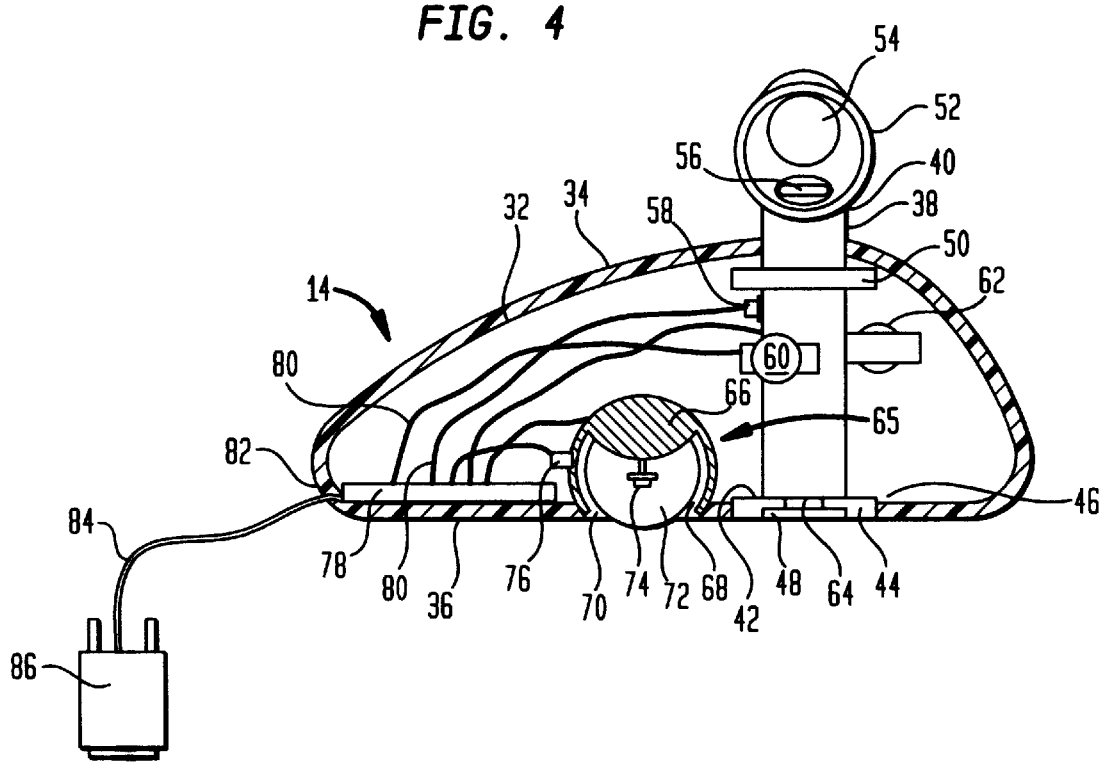
FIG. 4 is a partial cross sectional view of the controller according to the present invention.

Referring to FIG. 4, the controller 14 of the present invention is shown without the cue 12 mounted thereto. The controller 14 includes a case 32 to house elements of the controller 14. The case 32 is composed of plastic, light alloys or other composite materials, and has an upper surface 34 and a lower surface 36.

A stalk or arm 38 with opposed upper end 40 and lower end 42 extends through the case 32 from between the lower surface 36 and the upper surface 34, so that the upper end 40 protrudes from the upper surface 34 of the case 32. The stalk 38 is rotatably mounted within the case 32 with the lower end 42 seated in a mounting 44 at a bottom 46 of the case 32. A tension spring 48 is disposed at the mounting to contact and bias the stalk mount. A support 50 for the stalk is disposed at the interior of the case 32 to encircle an exterior surface of the stalk 38 proximate to where the stalk 38 protrudes from the upper surface 34 of the case 38. The support 50 also functions as a stop to prevent the stalk from being extracted from the housing.

A control ring 52 is mounted to the upper end 40 of the stalk 28. The control ring 52 includes a passageway 54 in which the cue 12 is received for reciprocating movement. A first optical reader 56 is mounted in the control ring 52 to sense movement of the cue 12 through the control ring 52. A second optical reader 58 is mounted to the exterior surface of the stalk 38 and is activated by the rotational movement of the stalk 38 about its longitudinal axis.

A first control button 60 is mounted to extend from a right or thumb side (see also, for example, FIG. 5B) of the case 32. A second control button 62 is mounted to a finger or left side (see also, for example, FIG. 5C) of the case 32. Referring to FIG. 4 a third control button 64 is mounted at the lower end 42 of the stalk 38 and is activated by pressure exerted on the tension spring 48 at the bottom 46 of the case 32.

Still referring to FIG. 4, a subassembly to signal further movement of the case 32 along the X and Y axis, and any angle therebetween, is generally indicated at 65 and arranged at the interior of the case 32. The subassembly includes a circumferentially shaped wall 66 forming a chamber 68 having an opening 70 in communication with an exterior of the case 32 at the bottom 46 of the case. A spherical member, such as a mouse ball 72 is rotatably mounted in the chamber 68, such that a portion of the ball 72 extends through the opening 70 to contact and support the case 32 for movement over an underlying surface (not shown). A third optical reader 74 is mounted to the circumferentially shaped wall 66 to generate signals responsive to movement of the mouse ball 72 along the X axis. A fourth optical reader 76 is also mounted to the circumferentially shaped wall 66 to generate signals responsive to movement of the mouse ball 72 along the Y axis.

A circuit board 78 is mounted at the interior of the case 32. Wiring 80 interconnects the circuit board 78 with the elements aforementioned. An aperture 82 is formed at a rear of the case 32 through which a lead 84 for a communications port plug 86 extends for connection to the circuit board 78.

Figure 5A:
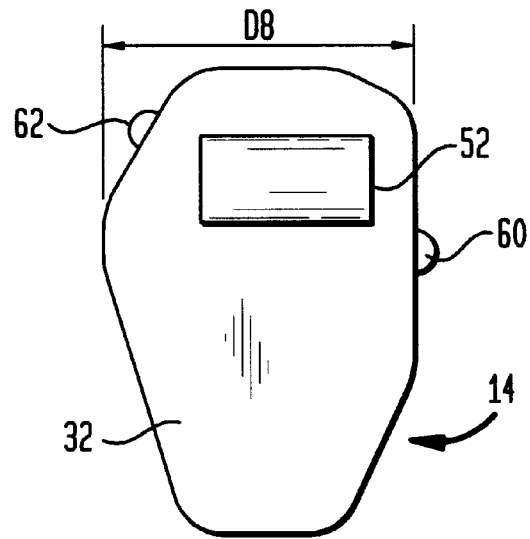
FIGS. 5A–5C are top, right and left side views, respectively, of the controller according to the present invention.
Figure 5B:
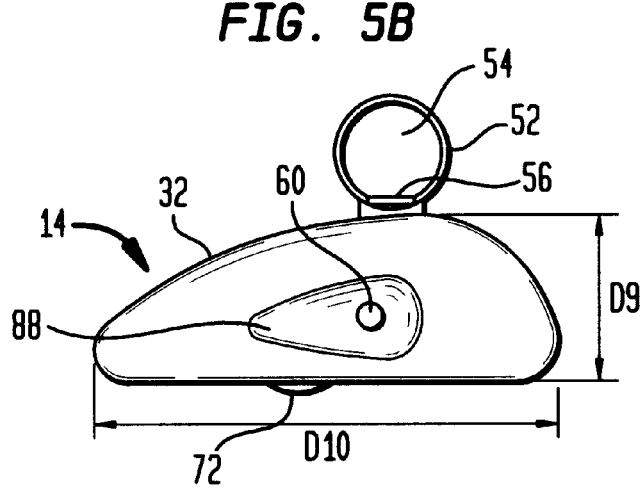
Figure 5C:
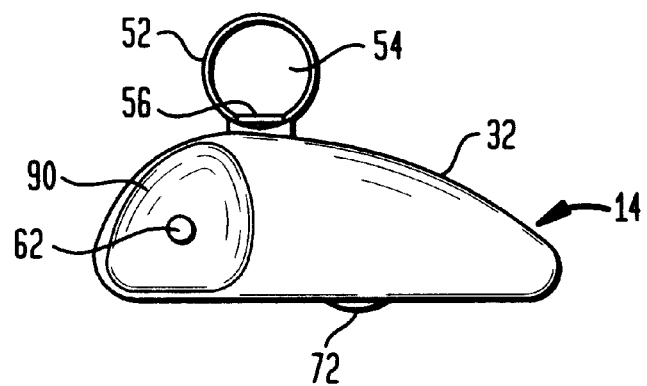

In FIGS. 5A–5C, views of the case 32 for the controller 14 according to the present invention are shown. The first and second control buttons 60,62 are shown, respectively, extending from their respective sides of the case 32. The right or thumb side of the case 32 in FIG. 5B is formed with a first depressed region 88 from which the first control button 60 protrudes for activation. The first depressed region 88 cradles the user's thumb and provides comfort when holding the case 32. The first region 88 permits the user to activate the first control button 60 with practically any portion of the thumb.

The finger or left side of the case (FIG. 5C) is similarly provided with a second depressed region 90 from which the second control button 62 protrudes for activation. The second depressed region 90 also provides for increased ergonomics and comfort for the user's fingers, as well, permitting a substantial portion of the user's finger to depress and actuate the second control button 90. The first and second control buttons 60,62 and control ring 52 enable simulation of the movement of the cue 12, as well as the "English" that the user can effect on the game ball. Referring to FIGS. 5A and 5B, a preferred series of dimensions for the controller 14 are as follows:

D8=2-½ inches
D9=1-¼ inches
D10=3-½ includes

Although the dimensions indicated for D8–D10 are preferred, other dimensions can be employed for the case 32 of the controller 14 of the present invention depending upon the size, strength and dexterity of the user's hand.

In operation, the cue 12 is fitted through the control ring 52 to activate the first optical reader 56. As the cue 12 is moved, the coating 28 contacts and activates the optical reader 56. The case 32 is grasped and moved along the X and Y axes, as well as movements therebetween, so that the user is in effect using a combination computer mouse and a joy stick. This permits the cue 12 to be tilted through a variety of angles to effect the necessary "English" to control the pool ball.

The control ring 52 for the cue 12 and the third control switch 64 at the bottom 46 of the case 32, and the X and Y optical readers 56,58 are interconnected for coaction as follows. The first optical reader 56 in the control ring 52 is actuated when the control ring 52 is pushed downward against the surface underneath the case 32 to depress the third control switch 64 at the bottom 46 of the case 32. This action transmits a SHOOT command to the system software. As the third control switch 64 is being depressed, the X and Y optical readers 56,58 are disabled, i.e. since the user is performing a shot on the game ball, there is no reason that further movement would occur along the X and Y axis or any angle therebetween. After the SHOOT command, the user relieves the pressure on the control ring 52 so that the first and second (X and Y, respectively) optical readers 56,58 are again actuated for a subsequent shot at the game ball. Rotation of the stalk 38 is used as a fine adjustment for aiming the cue 12 prior to taking a shot. That is, after the case 32 is moved by the user with his hand to effect the optimum position for the cue 12 to contact the game ball, the stalk 38 is rotated to mimic the finite adjustments of the human wrist to perfect the shot.

When the second control button 62 at the finger side of the case 32 is depressed (the left mouse button), a ZOOM command is generated to the computer. When pressure is released from the second control button 62, aiming control is again available to the user.

Use of the computerized pool cue and controller of the present invention 10 provides the user with a "virtual pool" simulation incorporating standard mouse and keyboard commands to control the software.

Preferably, the control ring 52 for the cue 12, the stalk 38 and the third control button 64 will substitute for the control functions frequently used with the S key and X mouse movement as shown in the following chart. The preferable keyboard commands for controlling the system software for the invention with conventional keyboards is as follows:

| Keystroke | = | Command |
|---|---|---|
| A | | Aim Cue |
| S | | Shoot Ball |
| E | | Move Cue Tip on Ball (English) |
| Left Mouse Button Hold | | Zoom in and Out |
| B | | Raise Butt of Cue (Masse' Shots) |
| CTRL | | Toggle Fine Tune Aiming |
| V | | Change View |
| M | | Move Ball |
| C | | Move Center Point of View |
| X | | Snap to Overhead View |
| F | | Vary Tracking Force Lines |
| H | | Select Ball to Move |
| SHIFT | | Toggle Amplify (Used for First Rack Break) |
| L | | Toggle Table Lines ON/OFF |
| O | | Overhead View |
| R | | Replay Last Shot |
| T | | Tracking Lines |
| U | | Undo |
| Z | | Zip to Results |
| ESC | | Main Menu |

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. An electronic controller apparatus and cue stick for pool or billiard simulation games, comprising:

a housing adapted to move over an underlying surface and having:
 a top,
 a bottom,
 a sidewall interconnecting the top with the bottom for providing the housing with an interior space,
 a first depressed region at an exterior surface of the sidewall,
 a second depressed region at the exterior surface of the sidewall at an opposite side of the housing;

a stalk rotatably mounted at the interior space of the housing, the stalk having an upper end extending from the top of the housing, and a lower end terminating at the interior space of the housing proximate the bottom of the housing;

a first support member disposed in the interior space at the bottom of the housing to support the lower end of the stalk;

a second support member disposed at the interior space near the top of the housing to support the upper end of the stalk;

a control ring mounted to the upper end of the stalk, the control ring having a bore extending therethrough;

a cue stick having a coating of rubber compound along a portion of an exterior surface thereof, the cue stick constructed and arranged for movement through the bore of the control ring;

a first sensor assembly mounted to the upper end of the stalk and exposed to the bore of the control ring for generating a signal responsive to movement of the cue stick through the bore;

a second sensor assembly mounted to an exterior surface of the stalk for generating a signal responsive to rotational movement of the stalk about a longitudinal axis of the stalk;

a first control button extending from the sidewall at the first depressed region of the housing between the top and bottom of the housing;

a second control button extending from the sidewall at the second depressed region of the housing between the top and bottom of the housing;

a spring supported by the first support member for coaction with the lower end of the stalk for biasing the stalk in a direction parallel to the longitudinal axis of the stalk;

a mouse ball disposed at the interior space of the housing, a portion of the mouse ball extending through the bottom of the housing to contact the underlying surface;

a third sensor assembly mounted at the interior space of the housing for generating a signal responsive to movement of the mouse ball along the underlying surface;

a circuit board disposed at the interior space of the housing;

means for interconnecting the circuit board with the stalk, the control ring, the first, second and third sensor assemblies, and the first and second control buttons;

wherein movement of the stalk, mouse ball, cue stick, and first and second control buttons generates signals to the circuit board with information about movement of the cue stick to display the effects of cue stick activity.

2. An electronic controller apparatus for controlling pool or billiard simulation games including a game ball and cue stick, comprising:

a housing adapted to move over an underlying surface;

first control means extending upwardly from the housing and having:
 an upper support portion adapted to receive a cue stick;
 sensing means disposed in the housing, in the first control means and in the upper support portion for sensing the position and movement of the cue stick, said sensing means including a first sensor assembly mounted to the upper support portion of the first control means for sensing movement of the cue stick therethrough, a second sensor assembly mounted to the housing for sensing rotational movement of the first control means, and a third sensor assembly mounted to the housing for sensing movement of the housing along the underlying surface;

wherein the sensing means provides information of the position and movement of the cue stick to circuitry which processes the information for the input into a computer to display the effect of the cue stick activity.

3. The electronic controller apparatus according to claim 2, wherein the housing further comprises:

a first region at a first side of the housing between an upper surface and a lower surface of the housing, said first region including a first switch extending therefrom, said first switch adapted to transmit a signal indicating contact of an end of the cue stick on a select area of a same ball, and a second region at a second side of the housing between the upper surface and the lower surface and substantially opposite to the first region, said second region including a second switch extending therefrom, said second switch adapted to transmit a signal representing movement of the end of the cue stick toward and away from the game ball.

4. The electronic controller apparatus according to claim 2, wherein the first control means comprises:

a lower portion opposite to the upper portion and disposed at an interior of the housing, a receptacle within the housing for supporting the upper portion of the first control means, and a support member disposed at the interior of the housing proximate the lower surface of the housing for supporting the lower portion of the first support means.

5. The electronic controller apparatus according to claim 2, wherein the second and third sensor assemblies are mounted at an interior of the housing.

6. The electronic controller apparatus according to claim 2, wherein the cue stick comprises:

a coating of rubber compound along a portion of an exterior surface of the cue stick for coaction with the first sensor assembly.

7. The electronic controller apparatus according to claim 2, further comprising:

means for interconnecting the first control means and the sensing means.

8. The electronic controller apparatus according to claim 3, further comprising:

a third switch disposed between the lower portion of the first control means and the support member for being actuated upon depressive force exerted on the first control means.

9. The electronic controller apparatus according to claim 2 wherein said first, second and third sensor assemblies include optical reader sensors.

10. A device for simulating the play of a game of pool and the action and feel of the use of a pool cue stick comprising:

a housing adapted to move over an underlying surface, said housing including a top, a bottom and sidewalls connected together to provide an interior space;

a stalk rotatably mounted within said housing at the bottom and extending upwardly through the top;

first optical sensing means secured at the upper end of said stalk above said housing, said first optical sensing means generating a signal upon reciprocal movement of a cue stick thereover;

second optical sensing means secured along a side of said stalk and generating a signal upon rotary movement of said stalk;

a rotatable ball mounted on the bottom of said housing and extending therethrough for rotatable movement along said underlying surface;

third and fourth optical sensing means mounted adjacent said ball for generating signals responsive to movement of said ball along respective X and Y axes of said underlying surface;

electrical circuit means within said housing connected to said first, second, third and fourth optical sensing means for receiving the signals therefrom; and means connected to said circuit means for communicating said signals to external utilization means.

11. The device according to claim 10 including first control switch means mounted on the bottom of said housing below said stalk operative to disable said third and fourth optical sensing means upon depression of said stalk for applying a first control signal to said external utilization means.

12. The device according to claim 11 including second and third control switch means mounted on opposite outer sides of said housing and connected to said circuit means for communicating second and third control signals to said external utilization means.

13. A device for simulating the play of a game of pool and the action and feel of the use of a pool cue stick comprising:

a housing adapted to move over an underlying surface;

an interior space disposed in said housing;

translation means to enable movement of the housing over an underlying surface;

sensing means in said housing adapted to sense movement of the housing;

signal generating means in said housing adapted to generate a signal in relation to said sensing means to indicate movement of said housing over an underlying surface;

cue receptacle means operatively associated with the housing adapted to receive a pool cue stick;

cue sensing means operatively associated with said cue receptacle means to sense movement of a pool cue stick associated with said receptacle means; and cue signal generating means in said cue receptacle means to generate a signal in relation to said cue sensing means to indicate movement of a pool cue stick in relation to said cue receptacle means.

* * * * *